2,222,903

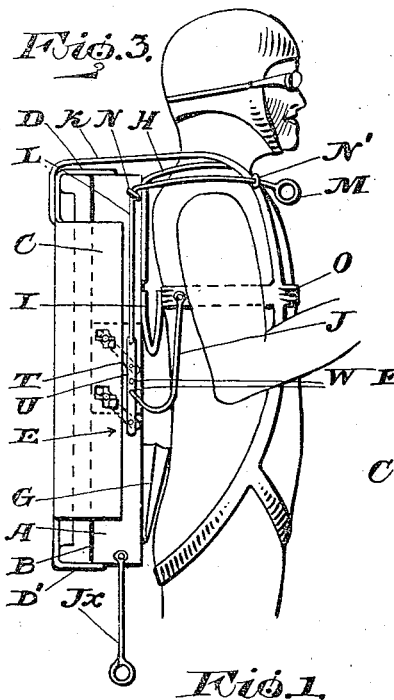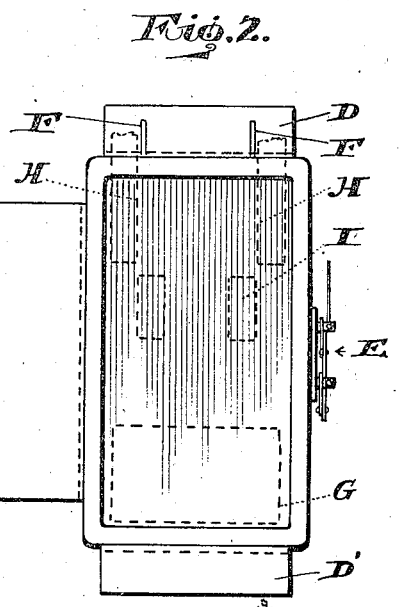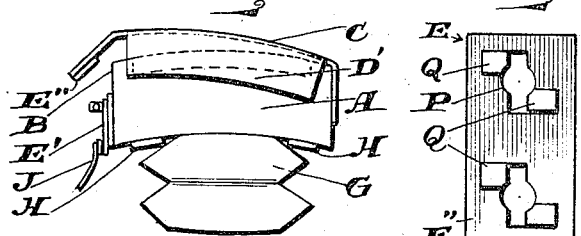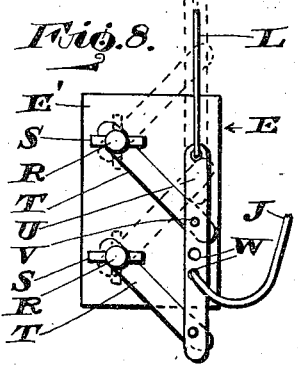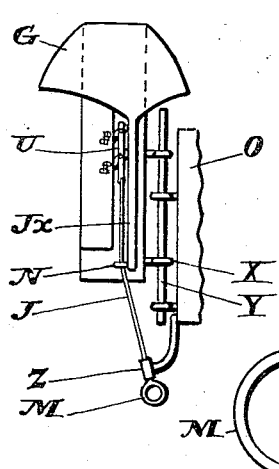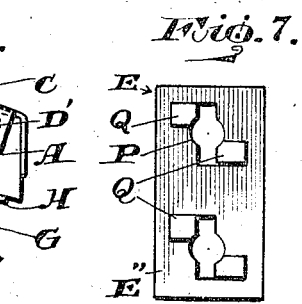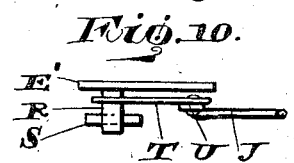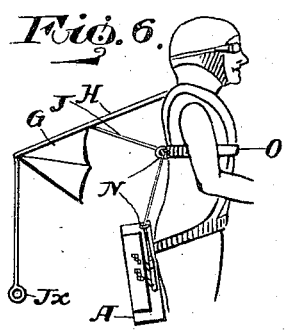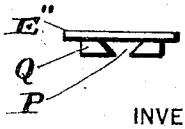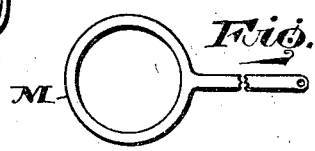
Nov. 26, 1940.     R. H. HART     2,222,903
PARACHUTE APPARATUS
Filed April 28, 1937
INVENTOR
Richard H. Hart
Munn, Anderson & Liddy
ATTORNEY Patented Nov. 26, 1940

UNITED STATES PATENT OFFICE 2,222,903

PARACHUTE APPARATUS

Richard H. Hart, New Orleans, La., assignor, by direct and mesne assignments, to Autochute Corporation, New Orleans, La., a corporation of Louisiana Application April 28, 1937, Serial No. 139,427

13 Claims. (Cl. 244—148)

My invention relates to improvements in parachute containers and parachute launching devices, and it consists in the combinations, constructions, and arrangements hereinafter described and claimed.

Wearers of parachutes have in many cases lost their lives, not through any structural failure of the apparatus, but through physical or mental incapacity of the wearer to effect release of his parachute. A device providing automatic release, if properly constructed, would have prevented a large proportion of such loss of life.

I am aware that various contrivances have been devised for the automatic release of parachutes from their containers, but all such devices have to the best of my knowledge and belief proven impractical for use under any and all conditions for one or more of the following reasons:

1. The means providing automatic release has not been sufficiently positive in its action;
2. No alternative means of automatic release has been provided;
3. The contrivances have been inherently susceptible of accidental and unintentional release at times when release would be inconvenient or dangerous;
4. Means have not been provided for prevention by the wearer of automatic release during periods when he is aware that such release would be inconvenient or dangerous; or, if provided, jeopardized automatic release in time of need;
5. Specific and positive means for manual release of the parachute from the container have not been provided, against the contingency of failure or dangerous delay of automatic release.

During the evolution of my invention, I have kept the above considerations continually in mind, with a view to contriving an apparatus which should have none of the defects mentioned, and which should, in fact, preserve the desirable features of manually operated devices with the added safety factor of automatic operation when such operation is needed; therefore:

An object of my invention is to provide a parachute container which will release the contained parachute by means of resistance to the air, and in default of release by resistance to the air will release the parachute by centrifugal force, and in default of any automatic release provides specific and positive means for manual release, and A further object is to provide a parachute container susceptible of automatic operation, such automatic operation being controllable at will by the wearer of the apparatus.

My invention is illustrated in the accompanying drawing forming part of this application, in which:

Figure 1 is a view from beneath of the parachute container at the moment of opening.

Figure 2 is an elevational view of the fully opened container from the standpoint of one looking into it.

Figure 3 is an elevational view of the closed and fastened container as seen from its fastening side.

Figure 4 is an enlarged view of the rip-cord ring provided for manual operation.

Figure 5 is a side elevational view of the container as adapted for release by vertical movement.

Figure 6 is a side elevational view of the container as adapted for use as a seat-pack.

Figure 7 is an enlarged plan view of the receiving member of the releasable fastener.

Figure 8 is an enlarged plan view of the operating member of the releasable fastener.

Figure 9 is an enlarged cross-sectional view of the receiving member of the releasable fastener.

Figure 10 is an enlarged end view of the operating member of the releasable fastener.

Broken lines in Figure 8 indicate location of movable parts in receiving-releasing position; broken lines in other figures indicate phantom views of hidden parts.

Referring more particularly to Figures 1, 2 and 3, it will be seen that the parachute container has the form of a shallow bag A, of flexible material, with its shortest dimension in the fore-and-aft direction, this bag being attached to, and maintained in shape by, a frame B of metal or other durable material, preferably rubber-sheathed steel cable, substantially circumscribing the plane of the bag's greatest perimeter, said frame being so placed that it does not contact or press upon the wearer, to the end that the container and contained parachute may serve as a back-cushion, and frame having its horizontal segments so shaped as to cause the container to conform more or less perfectly to the wearer's back. Frame's projected perimeter is approximately rectangular in outline but with rounded corners, and bag and frame are of such sizes and shapes and so attached to the wearer that while wearer is seated the container will rest upon its lower end, and the wearer thereby be relieved of a greater or lesser portion of its weight.

The orifice of the bag is closable by means of the main flap C, and also if desired by auxiliary flaps such as D and D'; one or more of these flaps may be of stiff material or may be of flexible material and may if desired have stiffening means, such as thin metal stiffeners F attached thereto. Spring or elastic conventional means (not shown in drawing) may be added to facilitate opening of flaps if desired.

The fastening device E consists in two main parts, designated for convenience as the "operating member" and the "receiving member," the operating member E' being shown attached to the bag upon the side opposite to the point or points of attachment of the main flap, and the receiving member E" being shown attached to the main flap C at the extremity farthest from said flap's point or points of attachment to the bag. This arrangement may be reversed or otherwise modified, and a plurality of such fastening devices may also be employed if desired, the essential requirement being that the parts be so attached that when container is closed the receiving member or members shall be imposed upon the operating member or members in position convenient for locking the members together. The fastening device will be more particularly described hereinafter.

Attached to or connected with the bag, preferably upon the side next the wearer, is an expandable pocket G, or a series of such pockets, of any suitable material, capable of affording resistance to the air through which moved. A flap or flaps, or other air-resisting device or devices, may be employed in lieu of such pocket or pockets. Size or sizes and point or points of attachment or connection of any or all such air-resisting device or devices may be varied at pleasure, within the limits of performance of the desired function.

The container is shown attached to the wearer by means of suspending straps H, designated herein as "hinges," but may be attached by any other means which will permit movement and change of position or attitude, or both, by the container, without removal of the manual-release means hereinafter described from a position of ready access; such movement and change of position or attitude, or both, is automatically limited by means of the restraining straps I, designated herein as "check-straps," or by any other similarly functioning device or devices.

The member J, affording automatic opening of the container and herein designated as the "trip-cord," is shown attached at one end to the wearer's harness O, but may be, alternatively, attached to any convenient part of the wearer's person, apparel, or equipment within the limits of performance of the desired function; the other end of the trip-cord is attached to the releasable fastener in such manner as will be particularly diagrammed under Figure 8.

The parachute risers K, connecting the wearer's harness to the parachute, pass over the wearer's shoulders and the top of the container in a front-to-rear direction and enter the container beneath the upper edge of the main flap. The rip-cord L, employed for manual opening of the container, is attached to the releasable fastener in such manner as will be diagrammed particularly under Figure 8, passes through the guide-rings N and terminates in the stemmed ring M; such position of the said ring affording ready access at all times, regardless of container's attitude.

This construction and arrangement makes possible manual release of the parachute at any time desired, as well as making possible automatic release by means of the force of resisted air or by means of centrifugal force or by any combination of these means, resulting in a very high factor of safety.

The member Jx, serving to prevent operation of the release mechanism when the wearer so desires, is shown attached to the container in Figure 3, but may be attached to any other actuating or enabling member connected with the release mechanism, within the limits of performance of the desired function; such preventing member may have the form of a handle or leash for manual grasping, or it may have any other convenient form, one such being a stirrup for prehension by the wearer's foot.

Shown in Figure 4 is an enlarged view of the stemmed ring M of metal or other durable material, which is attached by any convenient means to one end of the rip-cord; the stem, designed to be encompassed by a ring, keeper, or sleeve, serves to maintain the ring in position for ready manual grasping.

In Figure 5, instead of using the hinges previously shown, the container is sustained and allowed vertical movement by attachment thereto of encircling members X sliding upon upright rods Y. In this adaptation, the trip-cord J serves also as the rip-cord for manual operation of the release mechanism, being retained in position by the sleeve or keeper X, which also serves as an anchor to prevent retraction of the ring. In this figure, the restraining member Jx is shown as having the form of a strap handle adapted for manual grasping by the wearer, but may have any other convenient form. The other details of this figure have the same approximate forms and the identical functions of the correspondingly lettered items in Figures 1, 2 and 3. This adaptation is especially adapted for release by centrifugal force and therefore more suited to the use of children.

In Figure 6, the hinges H are shown enlarged, extended, and otherwise so modified as to be impelled to movement by the force of resisted air or by centrifugal force, or both, and thus to actuate the release mechanism. The other details of this figure have the same approximate forms and the identical functions of the correspondingly lettered items in Figures 1, 2 and 3. The adaptation herein shown serves where a seat-pack is preferred.

In Figures 7, 8, 9 and 10, detailed views of the releasable fastener hereinabove referred to E' and E" are opposable plates of metal or other suitable material, the operating plate E' being equipped with rotatable studs R mounted thereon by any convenient means, such as collars or pins, said studs having locking pins S, or similarly functioning devices, rotation of the studs being achieved by means of the operating levers T, the connecting lever U, and the trip-cord J, as well as the rip-cord L, the trip-cord being attached to the connecting lever by means of one of the holes W in such manner as to exert an oblique pull thereon when the lower end of the container moves away from the wearer's person, and the rip-cord being attached to the connecting lever by any convenient means which will allow it to exert a more or less direct pull thereon whenever the stemmed ring attached at its opposite end is manually drawn from its normal position, the connecting lever being attached to the operating levers by means of the pivots V. The receiving plate E" has apertures P so shaped as to receive or release the studs and locking pins mounted on the operating plate when in the position indicated by the broken lines in Figure 8; and retaining them when in any other position, such as that indicated by the solid lines in said Figure 8, this locking fastener and container; the receiving plate also has stop-blocks Q, or other similarly functioning devices, for limiting the rotation of the studs and locking pins when inserted in the apertures, these stop-blocks also serving as guides for the entry and exit of the locking pins. The normal location of the trip-cord being between the container and the wearer's back, casual tripping and operation of the release mechanism is rendered unlikely. By attachment of the trip-cord to different points on the connecting lever, by means of the holes or other means provided therefor, the release mechanism may be made to function at varying points in the arc described by the container as its lower end is impelled away from the wearer, thus effecting quicker or slower release of such mechanism.

For the parachute used with this apparatus to operate, it is only necessary for the wearer to jump, fall, or be thrown clear of his aircraft. The force of the air encountered during descent, acting through the air-resisting device provided for that purpose, exerts a pull upon the trip-cord which in turn forces the connecting lever, operating levers, and rotatable studs with their locking pins into the position of release, thus allowing the flaps of the container to withdraw and the parachute to escape from the container; such withdrawal and escape may be accelerated by conventional means, but in any case will be accomplished through he force of encountered air. Even though, owing to a conceivable unfavorable attitude assumed by the wearer, the release mechanism should not function immediately, the container and other air-resisting devices are so contrived, arranged, and attached to the wearer as to more-or-less quickly force him into the feet-foremost position most favorable for the automatic operation of the release-mechanism.

Should the wearer leave his aircraft in a tumbling or spinning attitude unfavorable for operation of the release mechanism by means of air-resistance, such tumbling or spinning will serve to operate the release mechanism by the centrifugal force developed by such gyrations.

However, should automatic release be for any reason delayed, or the wearer be forced to leave his aircraft in such close proximity to the ground as to make reliance upon automatic release inadvisable, he has only to manually grasp the rip-cord ring always within reach and pull thereon to effect immediate release of the parachute and a safe descent.

I claim:

1. A container having a parachute therein, said container and parachute being adapted solely for connection to the intended load, flaps to confine the parachute in the container, locking means to secure the flaps, a harness to be attached to said load, movably carrying the container and having the parachute connected thereto, and means joining the locking means to the harness with initial looseness, said joining means becoming taut upon movement of the container relatively to the harness thereby to actuate the locking means and release the flaps.

2. A container having a parachute therein, means connecting the container to a supporting body which is adapted to fall free from an aircraft, closure means to confine the parachute to the container, locking means to secure the closure means, and means which responds to a change of position of the container with respect to its supporting body while falling, to automatically undo the locking means to free the closure means and release the parachute.

3. A container having a parachute therein, closure means to confine the parachute to the container, locking means to secure the closure means, a harness by which the container is secured to the body of a wearer, and a trip cord connected at its ends to the locking means and harness, being normally slack but tightening upon a shifting of position of the container in respect to the harness during the falling of the body, thereby to undo the locking means to free the closure means and release the parachute.

4. A container having a parachute therein, closure means to confine the parachute to the container, locking means to secure the closure means, a harness by which the container is secured to the body of the wearer, a trip cord connected at its ends to the locking means and harness, being normally slack but tightening upon a shifting of position of the container in respect to the harness during the falling of the body, thereby to undo the locking means to free the closure means and release the parachute, and restraining means connected between the harness and container to limit the change of position of the container in respect to the harness.

5. A container having a parachute therein, closure means to confine the parachute to the container, a harness, hinge means connecting the container to the harness at the approximate shoulder position of a person wearing the harness, said container being swingable away from the body of the wearer at the pivotal points of the hinges, means carried by the container at a place remote from the hinges, being resistant to the air and causing the swinging away of the container and the automatic displacement of the closure means.

6. A container having a parachute therein, closure means to confine the parachute to the container, locking means to secure the closure means, a harness, hinge means connecting one end of the container to the harness at the approximate shoulder level of a body having the harness attached thereto, and air resistant means at the other and free end of the container, catching the air during the falling of the body and causing the container to swing away on its hinge means, and trip means connected between the harness and locking means, becoming taut by the swinging away of the container thereby to undo the locking means to free the closure means and release the parachute.

7. A container having a parachute therein, closure means to confine the parachute to the container, locking means to secure the closure means, a harness, hinge means connecting one end of the container to the harness at the approximate shoulder level of a body wearing the harness, and a rip cord attached to the locking means, said rip cord having guide means adjacent to the hinge means, leading the free end of the rip cord over and virtually confining it to said shoulder level.

8. A container having a parachute therein, closure means to confine the parachute to the container, locking means to secure the closure means, a harness, slidable connecting means joining the container to the harness in back of a body wearing said harness, and trip means connecting the locking means to the harness, said trip means being tightened to undo the locking means when the container is slid by centrifugal force upon said connecting means.

9. A container having a parachute therein, closure means to confine the parachute to the container, locking means to secure the closure means, a harness carrying the container in respect to which harness the container is relatively movable during the falling of a body wearing the harness, and means which is adjustably connectible between the harness and locking means to vary the point of release of the locking means in the path of movement of the container from the harness.

10. A container having a parachute therein, closure means to confine the parachute to the container, locking means to secure the closure means, said locking means including a locking pin, an operating lever and a connecting lever which has a plurality of holes, a harness, hinge means connecting one end of the container to the harness, and a trip cord permanently connected at one end to the harness and adjustably connectible to the connecting lever at one of the holes, thereby to vary the point of release of the locking means through the operation of the operating lever and locking pin during the arc of movement of the container when swung on its hinge means.

11. A parachute container adapted to have a parachute packed therein, said container comprising two main opposable parts, releasable fastener means for securing said parts to normally close the container, said fastener means consisting of a turnable projection on one of said main parts said projection having a detent, lever means connected to said projection being specifically provided for amplifying the releasing power required for turning said projection, receiving means on the opposing part with which the projection and detent are connectible, a harness swingably carrying said container, said harness being attachable to an intended load, and means coupling the lever means to the harness, serving to turn said lever means and projection into a position of disconnection of the detent in respect to the receiving means when the container is swung in reference to the harness, thereby to permit opening of the container and the escape of the parachute.

12. A container having a parachute therein, said container and parachute being adapted solely for connection to the intended load, closure means to confine the parachute to the container, locking means to secure the closure means, trip means connecting the locking means to the load, said trip means being actuated by movement of the container with respect to the load, thereby releasing the locking means and freeing the parachute from the container.

13. A container having a parachute therein, fastening means to confine the parachute to the container, release means to undo the fastening means to permit escape of the parachute, such release means being actuated by movement of the container, and manually governed means for controlling movement of the container and thereby the release means, said manually governed means not functioning except by the will of the parachutist.

RICHARD H. HART.